United States Patent

[11] 3,609,308

[72] Inventors Stanley G. Lemon; Charles M. Donoho, both of Annapolis, Md.
[21] Appl. No. 723,438
[22] Filed Apr. 23, 1968
[45] Patented Sept. 28, 1971
[73] Assignee Chesapeake Instrument Corporation Shadyside, Md.

[54] DIGITAL MEASURING SYSTEMS
9 Claims, 17 Drawing Figs.

[52] U.S. Cl. .......... 235/92 PS, 340/347 AD, 235/151.11, 235/92 R, 235/92 EA, 235/92 CA, 235/92 PE
[51] Int. Cl. .......... H03k 13/02, G06m 3/06, H03k 21/36
[50] Field of Search .......... 235/92, 151.11; 340/347 AD; 318/20.320

[56] References Cited

UNITED STATES PATENTS

| | | | |
|---|---|---|---|
| 2,864,010 | 12/1958 | Rosenberg et al. | 235/151.11 X |
| 3,358,201 | 12/1967 | Jones | 235/151.11 X |
| 3,400,314 | 9/1968 | Wilson | 235/151.11 X |
| 3,086,708 | 4/1963 | Berkowitz et al. | 235/92 (50) |
| 3,153,193 | 10/1964 | Caldwell | 340/347 X |
| 3,213,361 | 10/1965 | Dornberger et al. | 235/92 (50) |
| 3,247,507 | 4/1966 | Moses | 340/347 |
| 3,422,424 | 1/1969 | Belet | 340/347 |

*Primary Examiner*—Maynard R. Wilbur
*Assistant Examiner*—Joseph M. Thesz, Jr.
*Attorney*—Cushman, Darby & Cushman

ABSTRACT: A system for determining and displaying both positive and negative speed of a rodmeter in relation to surrounding fluid is described. Depending upon whether the direction of movement of the rodmeter is forward or backward, the phase of the output of the rodmeter is either in phase with a reference signal or 180° out of phase with the reference signal. An error signal is generated between the sensed rodmeter signal and a response signal, the latter being generated by the error signal; and in order for the response signal to always be of such a phase with respect to that of the rodmeter signal so as to enable the generation of an error voltage signal proportional to the difference in amplitudes therebetween, a first reference signal is applied to a digital-to-analog converter and a second reference signal 180° therefrom is applied to a summing amplifier coupled to the output of the digital-to-analog converter. The summing amplifier output provides the response signal which changes phase by 180° whenever the phase of the rodmeter signal changes phase by 180°. Digital circuitry is also described which indicates by either analog or digital display the count registered in an up-down counter.

INVENTORS
STANLEY G. LEMON
CHARLES M. DONOHO
BY Cushman, Darby & Cushman
ATTORNEYS

INVENTORS
STANLEY G. LEMON
CHARLES M. DONOHO

BY Cushman, Darby & Cushman
ATTORNEYS

INVENTORS
STANLEY G. LEMON
CHARLES M. DONOHO

BY Cushman, Darby & Cushman
ATTORNEYS

INVENTORS

STANLEY G. LEMON
CHARLES M. DONOHO

BY Cushman, Darby & Cushman
ATTORNEYS

DIGITAL MEASURING SYSTEMS

BACKGROUND OF THE INVENTION

The present invention relates generally to improvements in measuring systems responsive to changes in AC signals, and more particularly to a new and improved system for determining and displaying both positive and negative speed of a rodmeter in relation to a fluid wherein a response signal is generated with respect to the rodmeter signal to produce an error signal and wherein the phase of the response signal is automatically maintained the same as the phase of the rodmeter signal.

The invention also relates to a novel digital circuitry for providing digital or analog display of analog input data.

In the field of speed determination and display for ships and the like, it has been the general practice to employ systems to indicate forward speed through a fluid. Although such devices have served the purpose, they have not proved entirely satisfactory under all conditions of service for the reason that it is often desirable to be able to determine when speed through the fluid is in a reverse direction and to display that condition along with the speed.

SUMMARY OF THE INVENTION

Accordingly, one general object of this invention is to provide a measuring system responsive to changes in AC signals, and more specifically to provide a system for determining and displaying both positive and negative speed of a rodmeter in relation to a moving fluid. To attain this, the present invention contemplates a unique arrangement having an input or sensed AC signal, an AC response signal, and an error signal generated by the response signal from a comparison of the input AC signal and the response AC signal. In addition, a circuit arrangement provides a given phase angle relationship between the input AC signal and the response AC signal during periods when the input AC signal is at a given phase angle and also when the input AC signal is 180° away in phase from the given phase angle. By so providing, this system has the capability of determining and displaying both positive and negative speed of a rodmeter in relation to the moving fluid in which it is immersed. Another general purpose of this invention is to provide for a flexible measuring system that is responsive to changes in AC signals wherein these phase changes represent various predetermined conditions to be measured.

Another object of the present invention is the provision of a reliable and inexpensive measuring system.

Another object is to provide a measuring and displaying system that is responsive to phase changes in AC input signals.

A further object of the invention is the provision of a system for determining and displaying both positive and negative speed of a rodmeter in relation to a moving fluid.

A further object of the invention is to provide digital counter circuitry for providing a digital or analog display of analog input data.

A further object of the invention is to provide digital circuitry for indicating a count registered in an up-down counter.

Other objects and features of the invention will become apparent to those skilled in the art as the disclosure is made in the following description of preferred embodiment of the invention as illustrated in the accompanying sheets of drawings.

DESCRIPTION OF THE PREFERRED EMBODIMENT

Figure 1:
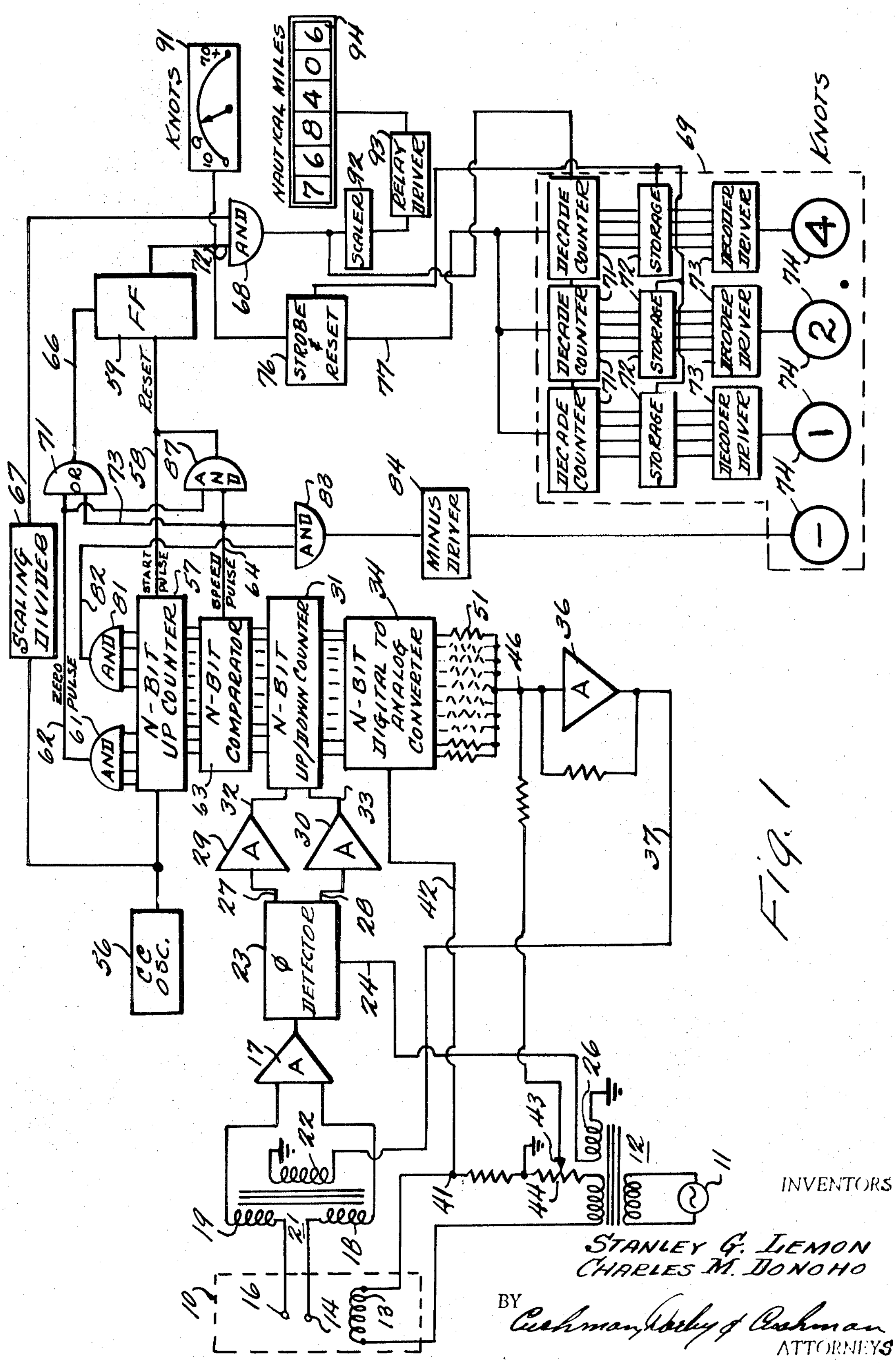
FIG. 1 shows, partly in schematic and partly in block diagram form, a preferred embodiment of the invention.

Referring now to the drawings, wherein like reference characters designate like or corresponding parts. Throughout the several views, there is shown in FIG. 1 a rodmeter 10, the motion of which through a surrounding fluid (e.g.) water is to be measured. In FIG. 1 an AC source 11, e.g., 110 volts at 60 $H_z$, is coupled to a transformer 12 which transforms the signal from source 11 so as to energize drive winding 13 of rodmeter 10. Rodmeters per se are well known. The embodiment herein described is of a system which is capable of measuring forward na backward movement of the rodmeter through fluid. The rodmeter, which is energized by drive winding 13, has output terminals 14 and 16 which are coupled to the input of amplifier 17 through windings 18 and 19 of comparing transformer 21. The comparing transformer 21 also includes winding 22, the purpose of which is to eliminate any signal input from windings 18 and 19 to the amplifier 17 when certain steady state conditions exist (discussed below).

The AC output of amplifier 17 is applied to one input of phase detector 23, which also has a second input 24 from a reference winding 26 in transformer 12. The phase detector 23 also includes two output lines 27 and 28, which under conditions to be described have direct voltages thereon.

The winding 26 of transformer 12 provides a reference signal via line 24 to phase detector 23, and the voltage across winding 26 in phase synchronized, with the voltage across winding 13. If this system is utilized in conjunction with a rodmeter having output terminals 14 and 16, the voltage across these terminals will be at 0° phase angle with respect to the voltage across winding 13 and with respect to that voltage across winding 26 for one direction of movement of the rod through the water, e.g., forward. For movement of the rod in the opposite direction, e.g., aft, the voltage across terminals 14 and 16 will be 180° out of phase with respect to the voltage across windings 13 and 26. Also, depending upon the direction movement of the rodmeter and its acceleration or deceleration, the phase angle between the signal inputs to phase detector 23 will be 0° or 180°.

Thus, if the movement of the rodmeter is increasing in a forward direction a direct voltage will appear at the output 27 of phase detector 23 while if the movement of the rodmeter is decreasing in the forward direction a direct voltage will appear at the output 28 of phase detector 23; and if there is no movement between the rodmeter and the surrounding fluid, zero volts will appear at the outputs 27 and 28. Phase detection circuits for use at 23 are per se well known and require no detailed description herein. A DC amplifier 29 is provided in output line 27 and a second DC amplifier 30 is provided in the output line 28. The amplified outputs of these amplifiers (when they occur) are provided to the "up" and "down" inputs of an *n*-bit binary (up-down) counter 31 via lines 32 and 33, respectively. Up-down counters are per se well known, see e.g., Bentley 3,261,012. The *n* output lines of the counter 31 are then applied to an *n*-bit digital-to-analog converter 34, which is shown in more detail in FIG. 4 and which possesses the capability with summing circuit 36 of providing via line 37 to winding 22 an alternating current that produces a voltage at winding 22 capable of nulling any signal from rodmeter terminals 14 and 16. The converter 34 is also supplied with reference signal from a first junction 41 via line 42, and a tap 43 is provided with respect to a resistor 44 wherein the tap is coupled to a second junction 46 located between converter 34 and summing circuit 36. Converter 34 is also connected with the system ground.

In the operation of that portion of the system thus far described, and assuming that the speed of the rodmeter through the surrounding fluid is constant and in a forward direction, a direct voltage on line 27 will be amplified y amplifier 29 so as to drive the counter 31 in an "up" direction.

Figure 4:
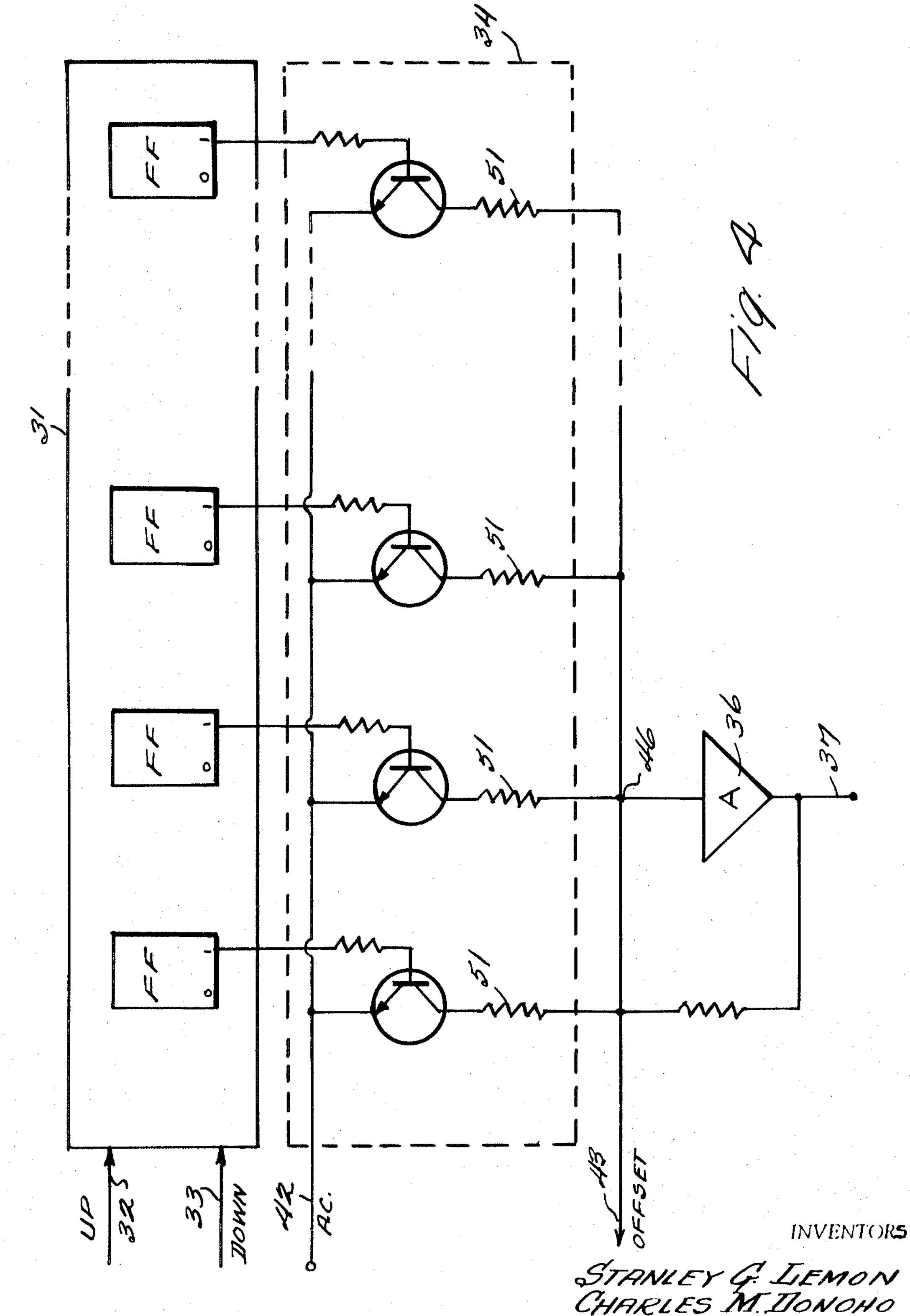
FIG. 4 shows, partly in schematic and partly in block diagram form, details of a portion of a system shown in FIG. 1.

REferring now to FIG. 4, wherein counter 31 and converter 34 are shown in greater detail, the *n* number of flip-flops within the "up" portion of the counter 31 are each coupled to the base of a respective transistor within the converter 34. Each of the respective transistors are emitter-coupled to line 42 which connects to first junction 41 where a signal in phase with the signal appearing on winding 13 is present. The constant voltage appearing at input line 32, as a result of the rodmeter moving forward in its surrounding fluid, will drive the flip-flops in counter 31 up. As this occurs and as each of the flip-flops is energized so that its "one" output is activated, the respective transistors within the converter 34 which are associated with those flip-flops having the "one" output energized, are turned on from a normally off state. In doing, current is permitted to flow through those transistors that are coupled to flip-flops in the "one" state so that a voltage appears across the collector resistors 51 of each of those transistors. In the example herein described, the flip-flops within the counter 31 are arranged so that the counter with the least significant digit is located to the left of the counter as represented in FIG. 4. Conversely, the flip-flop representing the most significant digit is located at the right end of counter 31 as represented in FIG. 4. Thus, in order to provide an analog voltage output from the converter 34 which is representative of the digital count within counter 31, the collector resistors 51 must be weighted with the largest resistor appearing in the collector circuit of the transistor associated with the flip-flop in counter 31 which has the least significant digit. By so doing, the greater voltage drop will occur across this resistor than will occur across the other collector resistors so that the voltage amplitude at the second junction 46 will be small in comparison to the voltages appearing at junction 46 as a result of circuit passing through the other collector resistors 51.

In this manner the digital count within counter 31 is converted to an analog voltage by converter 34 wherein the voltage at junction 46 is the resultant of the voltages appearing across all of the weighted collector resistors 51. Thus, as the rodmeter moves through the surrounding fluid in a forward direction the voltage on line 27 and on line 32 will drive the counter 31 up until the signal at junction 46 is sufficiently large, after having passed through summing circuit 36, to produce a signal on line 37 and winding 22 of transformer 21 which will counteract the voltages at windings 18 and 19 so as to "zero" or null the inputs 20 and the output of amplifier 17. This will, in turn, establish a binary count in counter 31 and the system will remain in this steadystate condition as long as the speed of the rodmeter remains constant.

If the speed of the rodmeter is increased, the voltage on line 27 will reappear. This is because the amplitude of the input signal to windings 18 and 19 increases with an increase in forward rodmeter speed, and part of this signal passes through amplifier 17. This signal issuing from amplifier 17 is at 0° phase angle with respect to the AC signal on windings 18 and 19, and a phase comparison is made within phase detector 23 between this signal and the AC signal available from winding 26 of transformer 12. This comparison results in a DC error signal on line 27. The counter 31 will then be driven to count up and the counting up will continue until the signal on windings 22 is sufficient to counteract the signals on windings 18 and 19. At this point a new null is reached. Similarly, if the speed of the rodmeter is decreased, while remaining in a forward direction the response signal on winding 22 will initially be larger than the input signal to windings 18 and 19. Therefore, the signal which enters and leaves amplifier 17 is 180° from the signal that existed in amplifier 17 when the forward speed was increasing. Under this condition the comparison in circuit 23 between the AC error signal from amplifier 17 and the AC signal from winding 26 causes the DC error signal to develop on line 28. This causes the counter 31 to count down until a null is again reached. Thus, the determination of whether the DC error signal appears on the "up" line 27 or the "down" line 28 depends upon which windings of the transformer 21 have the predominant effect in feeding amplifier 17.

If the direction of movement of the rodmeter is reversed, he voltage at terminals 14 and 16 is changed in phase by 180° with respect to the phase of the voltage which appeared at those terminals when the rodmeter was moving in a forward direction. This voltage is also180° out of phase with the voltage appearing on windings 13 and 26. Upon reversal of the direction of movement of the rod and the change in phase by 180° of the voltage at terminals 14 and 16, there must be a corresponding 180° phase change in winding 22 in order to maintain the error signal output from windings 18 and 19 into amplifier 17. The functioning of the system in reversing the phase of the signal on winding 22 when the rod moves in an aft direction will be later explained in more detail. When the rod is accelerating in the aft direction some of the signal on windings 18 and 19 will pass through to amplifier 17 and will issue from it. Thus, the phase detector 23 now has two inputs wherein the phase of the inputs are 180° apart. A voltage will then appear on line 28 at the output of phase detector 23 and the counter 31 would count down to its lower limit. This condition must be avoided, as is next explained.

At this point it should be understood that in order to provide this system with the capability of determining negative speeds as well as positive speeds of the rodmeter, the count within the counter 31 which represents zero speed of the rodmeter will not itself be zero, but will be another preselected count. Thus, at zero speed of the rodmeter this preselected count is frozen into the counter 31 an is continuously converted by converter 34 to an analog voltage.

Figure 2:
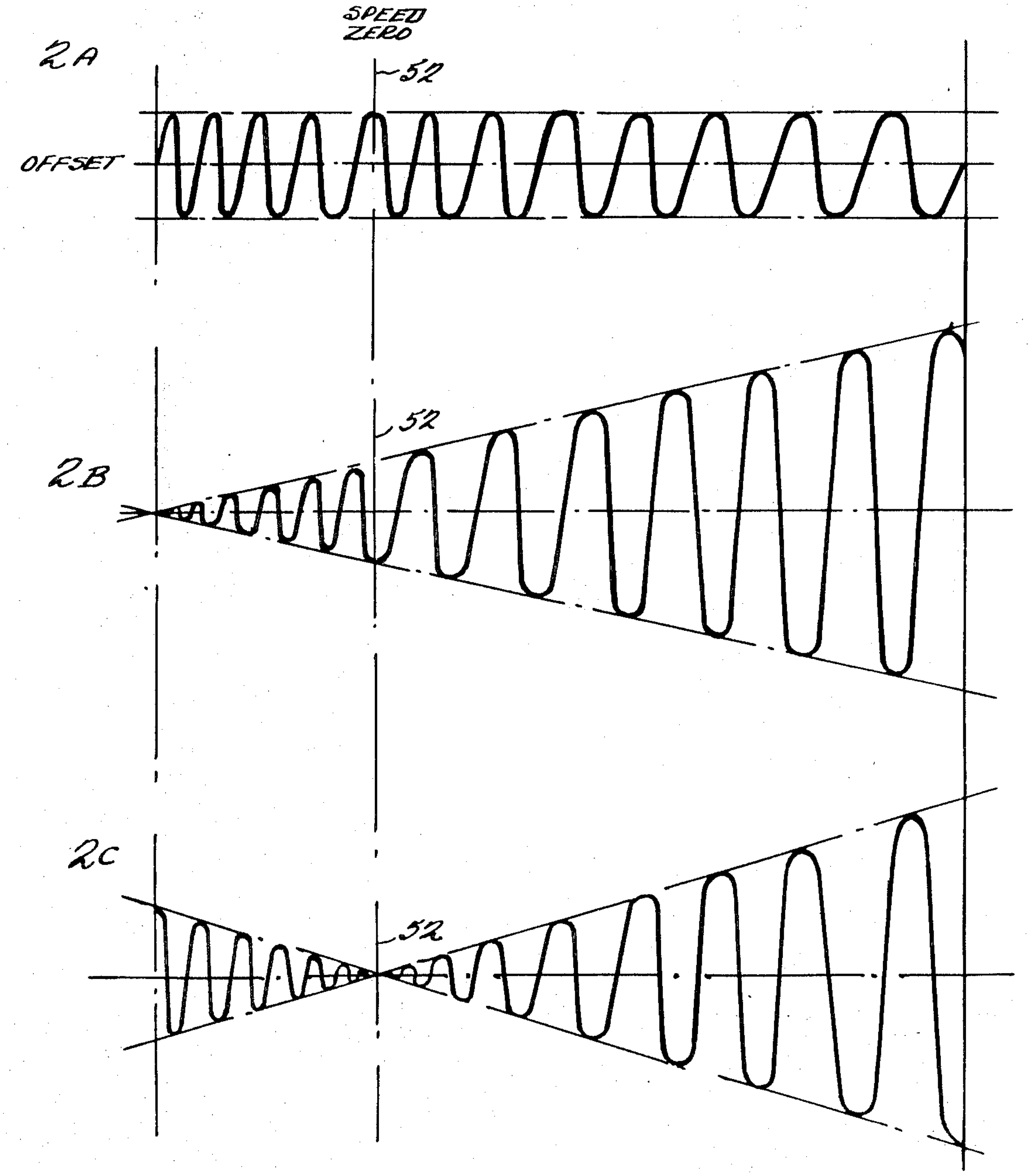
FIGS. 2*a*–2*c* graphically illustrate signals occurring at various points within the system.

Referring now to FIG. 2, there is shown in FIG. 2A a voltage signal obtained from resistor 44 and tap 43 which is 180° out of phase with that voltage appearing at the first reference voltage junction 41. The voltage shown in FIG. 2A is a constant amplitude AC signal ad provides one voltage input to the summing circuit 36 at the second reference junction 46. FIG. 2B at point 52 represents the signal output from converter 34 when the speed of the rodmeter is zero and when the count representing this zero speed is frozen within counter 31. This signal shown in FIG. 2B also provides an input to summing circuit 36 at junction 46, and the amplitude of the signal in FIG. 2A is adjusted by means of a movable tap 43 so that it equals the amplitude of the signal output from converter 34 at that preselected count in the counter 31 corresponding to zero rodmeter speed.

Thus, because the signal shown in FIG. 2A is obtained from tap 43 and the signal shown in FIG. 2B is obtained from junction 41, wherein the phases of the signals at tap 43 and junction 41 are 180° from each other, it can be seen that at point 52 in FIG. 2 the signals in FIG. 2A and 2B are equal in amplitude but 180° from each other in phase so that the output from summing circuit 36 from these two signals is zero, as shown in FIG. 2C at point 52. So when the speed of the rodmeter through the fluid is zero, the preselected count representing zero speed is frozen within counter 31 an the signal amplitude at the output of summing circuit 36, as represented in FIG. 2C, is zero so that there is no signal present in winding 22 of transformer 21.

When the velocity of the rodmeter is reversed and increased in the reverse direction, the phase of the signal at terminals 14 and 16 will change by 180° from the phase of the signal occurring there when the direction of movement of the rodmeter was in the forward direction. This change phase signal is detected by phase detector 23, since at this point in time there is no signal present on winding 22, and results in a DC output on line 28 and in the counter 31 counting down from its count which was representative of zero speed of the rodmeter. When this occurs, a binary count output from counter 31 is produced and the analog output of converter 34 is similarly produced, as represented by the signal shown in FIG. 2B to the left of point 52. As the amplitude of the output signal from converter 34 is thus reduced by the counting down of counter 31, the signal represented in FIG. 2A, which is obtained from tap 43 predominates at junction 46 so as to result in an output from voltage summing circuit 36 as shown in FIG. 2C to the left of the point 52.

Because the signal at tap 43 is 180° from the signal from the rodmeter, as it moves backward through the fluid, the signal applied to coil 22 of transformer 21 will counteract the signal appearing at windings 18 and 19 as a result of the backward movement of the rodmeter. Thus, the counter 31 will count down to the point where the output from summing circuit 36 appearing at winding 22 will completely counteract the signals appearing at windings 18 and 19 so that a new null condition is reached. At this point the count is frozen within counter 31 and represents the speed of the rodmeter in a backward direction. By adjustment of the tap 43 with respect to resistor 44 the amplitude of the voltage represented in FIG. 2A, which appears at junction 46, can be varied so that the count in counter 31 which represents zero speed of the rodmeter can be varied. Thus it is by the mixing of the signals from converter 34 and to 43 that the phase angle in winding 22 is automatically shifted by 180° to coincide with the 180° shift of the signal windings in 18 and 19 caused by reversing the direction of movement through the fluid.

Since when the speed of the rodmeter is zero the count in counter 31 is not zero, but is rather some preselected count, the counter 31 does not readily lend itself to direct speed readout for the user. To provide direct display of speed, direction of movement, and distance traveled, additional components are provided as now explained.

A very stable oscillator 56 of convenient frequency drives an *n*-bit binary output counter 57 repeatedly through its *n*-bit cycle, and at the beginning of each cycle a start pulse is produced on line 58. This a start pulse is represented in FIGS. 3A and 3F, and acts to reset flip-flop 59 so that the output therefrom is zero. In addition, an AND gate 61 is connected to predetermined stages of the *n*-bit counter 57 so that a "speed zero" pulse will appear on line 62 when the counter 57 reaches the preselected count which in counter 31 represents zero rodmeter speed. An *n*-bit comparator 63 is provided between counters 31 and 57 and is coupled so as to emit a "-speed" pulse on line 64 when the counts in counters 31 and 57 are equal. The flip-flop 59 is of the type that will change its state at every pulse upon input line 66 and that will be reset whenever a pulse appears upon line 58.

In general, clock pulses from oscillator 56, scaled down if desired by scaling divider 67, are supplied to a first AND gate 68 with an output from flip-flop 59. The output from gate 68 then drives visual display counter 69, which displays the number of pulses from oscillator 56 passed by AND gate 68 when the output of flip-flop 59 is triggered on. In addition, the counter 69 is of the type which shows the number of pulses in successive bursts of pulses and will not change its display count unless a number of pulses in an input burst is different from the number of pulses in the preceding burst of pulses.

Figure 3:
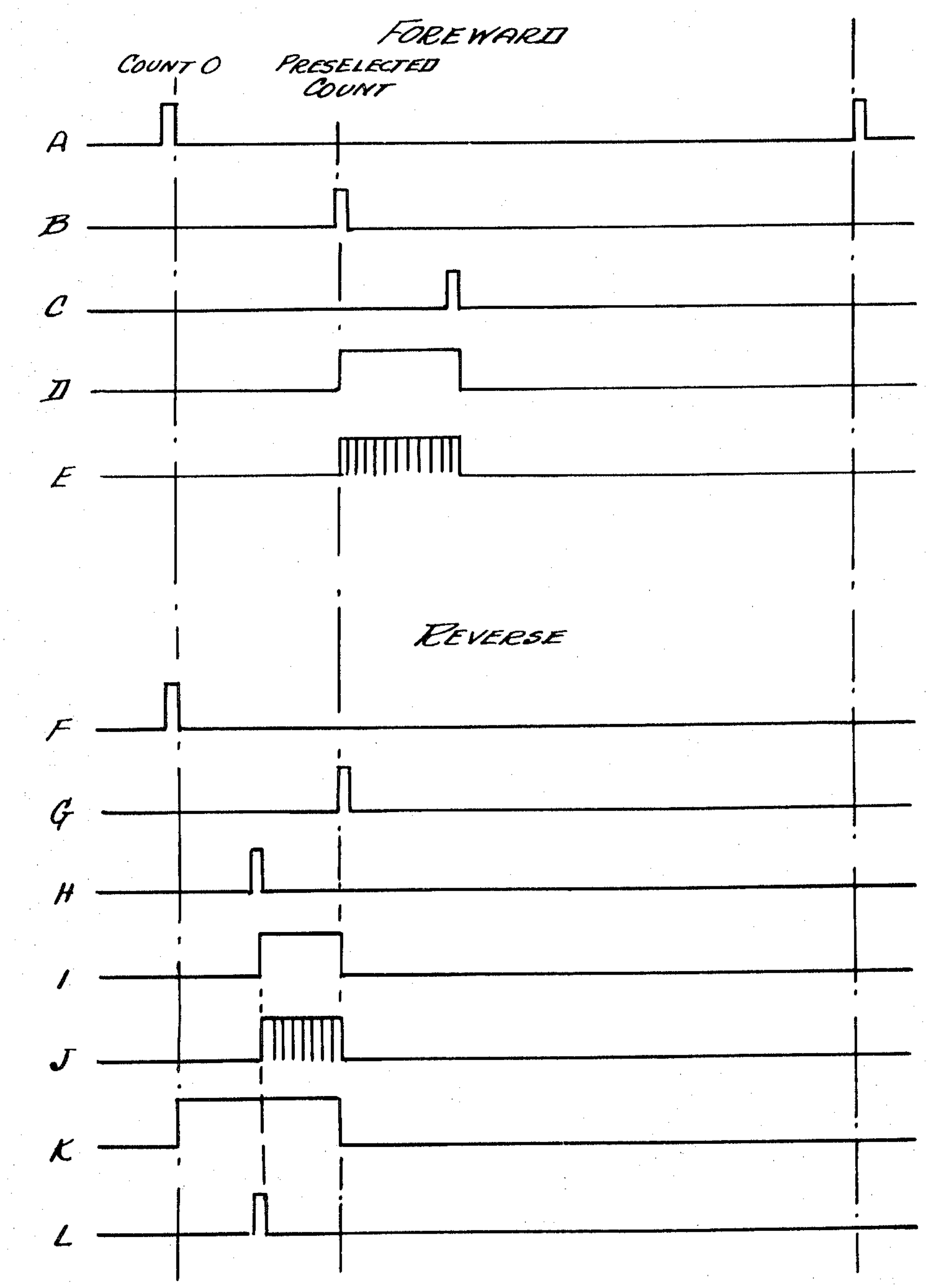
FIGS. 3*a*–3*l* also graphically illustrates signals occurring at various points within the system.

This operation will now be explained in more detail in conjunction with FIG. 3. To begin, assume that the rodmeter is moving forward through a surrounding fluid. The flip-flop 59 will be reset by a pulse on line 58 when counter 57 passes through its zero count. As the counter 57 continues to count up from its zero position it will first reach the preselected nonzero count which is the same as the count that in counter 31 is selected to represent zero rodmeter speed. The AND gate 61 is provided with inputs from counter 57 so that when this preselected count is reached, the AND gate 61 is activated so as to pass a pulse along line 62 through OR gate 71 and line 66 to the input flip-flop 59. This pulse is represented in FIG. 3B. The presence of this "speed zerp" pulse at the set input of flip-flop 59 triggers on the flip-flop as shown in FIG. 3D. This output information signal from flip-flop 59 is then passed through line 72 to one input of AND gate 68 while the other input of the AND gate 68 is a high frequency pulse train provided by the oscillator 56. As a result, the AND gate 68 begins to pass the pulses from oscillator 56 into the visual display counter 69.

The *n*-bit counter 57 then continues its count upward until its count equals that present in up-down counter 31. At this point, an output or "speed" pulse is produced on line 64 from comparator 63. This "speed" pulse passes through line 73, through OR gate 71 and into the input of flip-flop 59. Recalling that the flip-flop 59 is of the type that changes state at every pulse upon input line 66, the "speed" pulse changes the flip-flop output at line 72 to zero.

As is shown in FIG. 3C, 3D and 3E, the "speed" pulse triggers off the output pulse from flip-flop 59 and prevents AND gate 68 from passing any further pulses from oscillator 56 into the counter 69. The counter 69 includes decade counters 71, storage units 72, and decoder/drivers 73 which drive display tubes 74. In addition, the frequency of the oscillator 56 is calibrated with respect to the counter 69 so that the number of pulses passed by AND gate 68 will directly represent on display tubes 74 the speed of the rodmeter with respect to the surrounding fluid.

At the beginning of each pulse output from flip-flop 59 the strobe and reset 76 acts to clear the decade counters 71 to zero through line 77. Then as the pulses from divider 67 come through gate 68 counters 71 will register the total number of pulses through 68 as of reset of flip-flop 59. Then the strobe output of 6 conveys the count in storage devices 72 into the display driver 73. Thus the display tubes 74 (e.g., "Nixie" tubes) flash a digital speed display during every cycle of counter 57. Clearing of counters 71 on each such cycle prevents accumulation of counts in counters 71. Therefore, the speed display remains constant during periods of uniform rodmeter velocity through the fluid.

Next assume that the direction of movement of the rodmeter through the surrounding fluid is reversed. Reference now should be taken with respect to FIGS. 3F–3L. In this case, the "speed" pulse on line 64, as shown in FIG. 3H, will occur between the start pulse on line 58, as shown in FIG. 3F, and the "zero" pulse on line 62, as shown in FIG. 3G. In this case, flip-flop 59 will be set so as to provide an output pulse when the "speed" pulse is applied on line 66. While flip-flop 59 is set, AND gate 68 permits pulses from oscillator 56 to pass therethrough and into visual display counter 69. As the Up counter 57 continues to count from its start position up through the count representing the s speed in the reverse direction and finally to the count representing zero speed of the rodmeter, the gate 61 is then activated so as to permit a "-zero" pulse, as shown in FIG. 3G, to pass through OR gate 71 and into the input of flip-flop 59. This input pulse to the flip-flop 59 acts to stop the output pulse therefrom. Thus, and AND gate 68 has permitted pulses from oscillator 56 to pass into display counter 69 for the time period between the "-speed" pulse and the "zero" pulse, and these pulses from oscillator 56 upon registering in counter 69 represent the speed of the rodmeter in a reverse direction.

In order to show that the speed of the rodmeter is in the reverse direction a second gating means including gates 81 and 83 is use. The AND gate 81 is connected to certain of the stages of counter 57 so as to produce an output on line 82, as shown in FIG. 3K, for all counts of zero through the preselected count on counter 31 which represents zero speed of the rodmeter. AND gate 83 receives this gate output from line 82 and also receives the "speed" pulse from line 64, as shown in FIG. 3H, and a pulse issues from AND gate 83 when the speed is in the reverse direction, as shown in FIG. 3L. This pulse from gate 83 passes through a driver element 84 which illuminates a minus sign (−) in a display tube 74 to the left side of the display counter 69.

Another AND gate 87 is coupled with one input being line 64 wherein the "speed" pulse occurs, and the other input being line 62 wherein the "zero" pulse occurs. The purpose of this gate 87 is to guard against flip-flop 59 to assuming a spurious state when the rodmeter speed is at or near zero. The output of the gate 87 is coupled to the reset line 58 of flip-flop 59, so that when the "speed" and "zero" pulses overlap in time the flip-flop 59 will be reset to prevent any input to the visual display counter 69.

In addition to, or in place of, the counter 69, other speed indicating mans, such as averaging device 91 can be provided to indicate the instantaneous speed and direction of the rodmeter. In addition to a speed indication, it may be desirable to indicate the distance traveled by the rodmeter through the surrounding fluid, and this can be provided by a connection to the output of AND gate 68 as shown by the scalar 92, the relay driver 93, and the distance counter 94. By knowing the total number of pulses emanating from AND gate 68 and by knowing the time interval over which these pulses occurred, the distance traveled by the rodmeter is displaced in device 94.

The system of this invention effectively provides a means for determining and measuring phase changes in AC signals wherein an input AC signal is compared with an AC response signal to generate an error signal and wherein the error signal is determined by the response signal. This system also provides means for providing a given phase angle relationship between an input and a response signal during periods when the input signal is at a given phase angle and also during periods when the input signal is 180° away in phase from the fist given input signal phase utilizing this concept, the system of the invention accurately and effectively provides a means for instantaneously determining and displaying the speed of a rodmeter through a fluid and the direction of movement of the rod through the fluid.

The system also enables a digital or analog display of both forward and reverse speeds wherein the display shows the magnitude of both forward and reverse speeds increasing in count as the speed increases with an additional display to show if the direction of movement is forward or reverse. It will also be noted that by moving tap 43 to zero voltage (ground) the system will operate only for forward rodmeter movement. However, the entire capacity of the counter 31 is thusly made available to cover forward speed. Moving tap 43 to a maximum voltage position (sufficient for the amplitude as shown in tap 2A of FIG. 2 to equal the maximum in line 2B) will similarly enable the system to indicate only reverse rodmeter movement, but again making available the entire capacity of counter 31 to cover reverse movement. Of course, changing the count in counter 31 selected to represent zero speed of the rodmeter requires corresponding changes of the wiring between the counter 37 and the gates 61 and 82 to cause the display to show zero speed at the proper times. It will be observed that an extremely versatile system is thusly provided. For example, a given system can be readily adapted for use aboard surface ships where a substantially greater coverage of forward speeds than reverse speeds is desired, but the same system could be utilized aboard various types of subsurface craft which may be movable at equally great speeds forward or reverse. Or the system could be utilized for measuring the movement of tidal waters where similar ranges of velocities in both directions are anticipated. Still further the system is readily adapted to be used only in those situations where movement in one direction but not the reverse is anticipated and in these conditions the entire range of the counter is available to provide extreme accuracy in the measurement of the rodmeter velocity.

Although a specific embodiment has been described herein with respect to such determination of speed and direction of movement of a rodmeter through fluids, it should be understood that many modifications and variations of the present invention are possible in view of the above teachings. It is also to be understood, that within the scope of the appended claims, the invention may be practiced otherwise than as specifically described.

1. An electrical system responsive to phase changes in AC signals, comprising:

first mans responsive to a sensed AC signal and to a response signal for generating an error signal characteristic of the difference in amplitudes of said sensed signal and of said response signal:

second means associated with said first mans for providing said response signal wherein said response signal maintains a given phase relationship with said sensed signal during periods when said sensed signal is at a first phase angle and also when said senses signal is 180° from said first phase angle, said second means including:

AC amplifier means associated with said first means;

phase detector means in circuit relationship with said amplifier means;

up-down counter mans in circuit relationship with said phase detector means;

digital-to-analog converter means in circuit relationship with said up-down counter means;

a first voltage reference junction coupled to an input of said converter means;

a second voltage reference junction coupled to an output of said converter means;

voltage summing means in circuit relationship between said converter means and said first means, means associated with said up-down counter means for displaying the information measured by said system from said sensed AC signal, and wherein said display means includes:

up counter means;

means in circuit relationship with said up counter means for continuously cycling the count thereof;

comparator means associated with said up-down counter means and with said up counter means for providing an output signal when the counts on said counter means are equal;

first gating means in circuit relationship with said up counter means, said cycling means and said comparator means for passing the output signals from said cycling means for time intervals as determined by said up counter means and said comparator means; and means associated with said first gating means for visually representing the information measured by said system from said sensed AC signal.

2. The system of claim 1 further including:

second gating means in circuit relationship with said up counter means, said comparator means and said visual representing means for separately indicating the sense o said information on said visual representing means.

3. An information display system, comprising:

a first *n*-bit counter;

a second *n*-bit counter;

means in circuit relationship with said second counter for continuously cycling the count thereof;

comparator means associated with said first and second counters for providing an output signal when he counts on said counters bear a predetermined relationship;

first gating means in circuit relationship with said second counter, said cycling mans and said comparator means for passing from said cycling means during a cycle of said second counter an information signal therefrom representing the count difference between a preselected count in said second counter and a count there having said predetermined relationship to a count in said first counter;

means associated with said first gating means for visually representing the information represented by said information signal, and second gating means in circuit relationship with said second counter, said comparator means and said visual representing means for enabling the indication by said visual representing means of the sense of said information.

4. The system of claim 3 further including:

flip-flop means in circuit relationship with said second counter, said first gating means, and said comparator means.

5. The system of claim 3 further including:

third gating means in circuit relationship between said second counter and said flip-flop means; and fourth gating means in circuit relationship between said third gating means, said comparator means and said flip-flop means.

6. The system of claim 5 further including:

distance indicating mans in circuit relationship with said first gating means.

7. The system of claim 6 further including:

scaling divider means in circuit relationship between said cycling means and said first gating means.

8. An information display system for automatically computing and displaying the magnitude of difference between an actual counter contents and preselected contents thereof, said system comprising:

a first $n$-bit counter for containing sad actual counter contents:

a second $n$-bit counter;

means in circuit relationship with said second counter for continuously cycling the count thereof;

comparator means associated with said first and second counters for providing an output signal when the counts on said counters bear a predetermined relationship;

first gating means in circuit relationship with said second counter, with said cycling means and with said comparator means for passing from said cycling means, during a cycle of said second counter, an information signal therefrom representing the count difference between a preselected count in said second counter corresponding to said preselected contents and a count therein having said predetermined relationship to the actual counter contents in said first counter; and means associated with said first gating means for visually representing the information represented by said information signal.

9. A digital system for automatically computing and displaying the magnitude of difference between an actual counter contents and a preselected contents thereof, said system including:

a first $n$-bit counter for containing said actual counter contents;

a second $n$-bit counter;

means for continuously cycling the second counter;

a pulse source for emitting pulses at a predetermined frequency;

comparator means for comparing the count in the first and second counters and for generating an output signal when the counts therein bear a predetermined relationship;

registration means for registering the number of pulses applied thereto in a given time period; and gating means coupled to the pulse source, the comparator means and the second counter for gating to the registration means, during a cycle of the second counter, a number of pulses from the pulse source representing the count difference between a preselected count in the second counter corresponding to said preselected contents and a count therein having said predetermined relationship to the actual counter contents in the first counter.